UNITED STATES PATENT OFFICE.

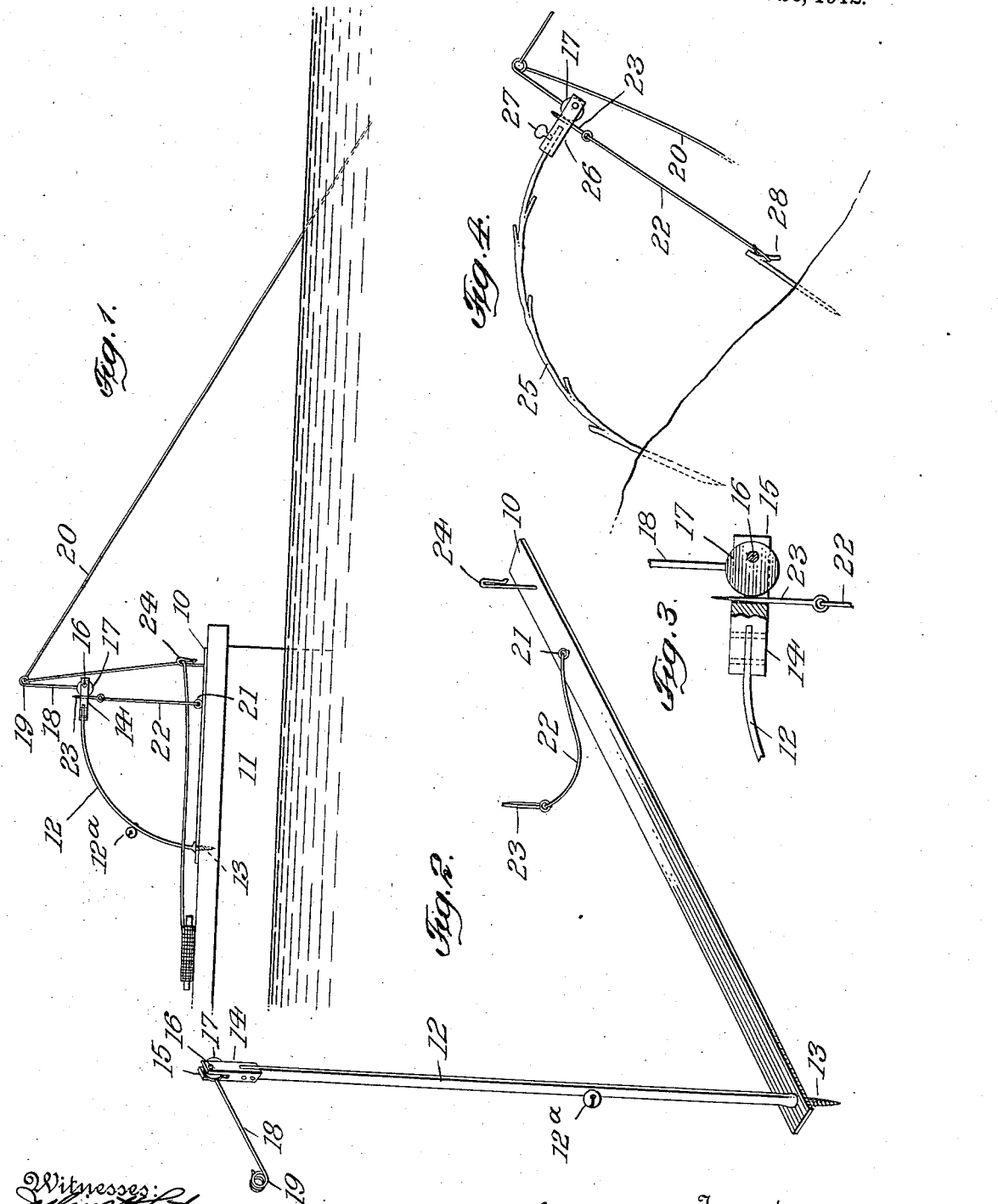

GEORGE PLÜSCHKE, OF NEW YORK, N. Y.

FISHING APPARATUS.

1,045,177.   Specification of Letters Patent.   Patented Nov. 26, 1912.

Application filed July 13, 1912.   Serial No. 709,218.

*To all whom it may concern:*

Be it known that I, GEORGE PLÜSCHKE, a citizen of Germany, residing at New York city, county and State of New York, have invented a new and Improved Fishing Apparatus, of which the following is a specification.

This invention relates to a fishing apparatus of novel construction which will cause the hook to be automatically thrust into the body of the fish, as soon as the latter strikes the bait. In this way the fish will become securely hooked without requiring continuous attention or skilled manipulation.

In the accompanying drawing: Figure 1 is a side elevation of a fishing apparatus embodying my invention; showing it set, Fig. 2 a similar view showing it sprung, Fig. 3 a detail of the catch, and Fig. 4 a perspective view of a modification of the apparatus.

Referring more particularly to Figs. 1–3, the device comprises a base plate 10 adapted to be placed on a dock 11 or other support. From plate 10, there extends upwardly a strong spring arm 12 having a lower threaded end 13 which is screwed through an aperture of the plate into the dock, so that in this way the device can be readily mounted in position and dismembered for transportation. To the free end of arm 12, there is secured a block 14 having a forked end 15 in which there is pivoted at 16 an eccentric disk 17. From disk 17, there extends a finger 18 having an open eye 19 adapted for the reception of the fishing line 20. At a point in front of spring arm 12, there is secured to plate 10, by means of a screw eye 21 one end of a short string 22, the other end of which carries a knife-edge blade 23. This blade is adapted to be inserted into fork 15 directly back of disk 17 and in conjunction with said disk constitutes a catch for holding the spring rod in its bent or set position. In use, the fishing line carrying the usual baited hooks and sinker is threaded through eye 19 and thence if desired through an additional keeper 24 mounted on plate 10 in front of screw eye 21. The spring arm 12 is now bent forward and held in its set or tensioned position by means of knife blade 23, which is projected into fork 15 and held thereto by slightly turning disk 17 backward, so that the disk owing to its eccentric pivot will bear delicately against the blade. When a fish strikes the bait, the resulting pull on the line will turn the disk in the opposite direction, so that the catch is opened and the spring arm, thus released, will fly up with considerable force to securely hook the quarry, while a bell 12$^a$ carried by arm 12 will sound an alarm.

In Fig. 4 a modification is illustrated which is to be used in case a dock or similar support is not available. In that case, a springy wooden rod 25 is thrust with one end into the river bank or shore, while its other end carries the forked block 26 to which the eccentric disk 17 is pivoted. The block is provided with a rear bore, so that it may be readily slipped over the end of rod 25 to which it is held by a clamp screw 27. The string 22 of knife blade 23 is attached at its lower end to a hook or crutch 28 pushed into the ground some distance in front of rod 25.

It will be seen that my fishing apparatus can be readily taken apart for transportation and may be as readily mounted. It requires no immediate or skilled attention, as a fish once hooked will remain captured until drawn in at the convenience of the fisherman.

I claim:

1. A fishing apparatus comprising a base, a spring arm secured thereto at one end, a rotatable disk having an eccentric pivot and mounted on the other end of the spring arm, a finger secured to the disk and adapted to be engaged by a fishing line and a catch member secured to the base and adapted to be engaged by the disk.

2. A fishing apparatus comprising a base, a spring arm secured thereto at one end, a rotatable disk having an eccentric pivot and mounted on the other end of the spring arm, a finger secured to the disk and adapted to be engaged by a fishing line, a knife blade adapted to be engaged by the disk, and a string connecting the knife blade to the base.

3. A fishing apparatus comprising a base, a spring arm secured thereto at one end, a forked block carried by the other end of the spring arm, a rotatable disk having an eccentric pivot and journaled in the forked block, a finger secured to the disk and adapted to be engaged by a fishing line, and a catch member secured to the base and adapted to be engaged by the disk.

GEORGE PLÜSCHKE.

Witnesses:
FRANK V. BRIESEN,
KATHERYNE KOCH.

Copies of this patent may be obtained for five cents each, by addressing the "Commissioner of Patents, Washington, D. C."